United States Patent [19]

Holmes

[11] B 3,925,292

[45] Dec. 9, 1975

[54] POLYTETRAFLUOROETHYLENE AQUEOUS DISPERSIONS WHICH PROVIDE COATINGS OF IMPROVED GLOSS

[75] Inventor: David Alan Holmes, Vienna, W. Va.

[73] Assignee: E. I. du Pont de Nemours and Company, Wilmington, Del.

[22] Filed: Nov. 5, 1973

[21] Appl. No.: 412,619

[44] Published under the Trial Voluntary Protest Program on January 28, 1975 as document no. B 412,619.

Related U.S. Application Data

[63] Continuation-in-part of Ser. No. 72,555, Sept. 15, 1970, abandoned.

[52] U.S. Cl......... 260/29.6 F; 117/72; 117/161 UZ; 260/29.6 RB

[51] Int. Cl.² ........................................ C08L 27/18
[58] Field of Search.... 260/29.6 F, 29.6 R, 29.6 PT, 260/29.6 RB

[56] References Cited
UNITED STATES PATENTS

| 2,686,767 | 8/1954 | Green | 260/29.6 F |
| 3,019,206 | 1/1962 | Robb | 260/29.6 F |

*Primary Examiner*—Harold D. Anderson

[57] ABSTRACT

Polytetrafluoroethylene aqueous dispersions which contain a minor amount of tetrafluoroethylene copolymer and nonionic surfactant added after polymerization provide polytetrafluoroethylene coatings of improved gloss.

9 Claims, No Drawings

POLYTETRAFLUOROETHYLENE AQUEOUS DISPERSIONS WHICH PROVIDE COATINGS OF IMPROVED GLOSS

This application is a continuation-in-part of application Ser. No. 72,555, filed Sept. 15, 1970 now abandoned.

This invention relates to polytetrafluoroethylene aqueous dispersions used for coating purposes, and more particularly to such dispersions which provide coatings of improved gloss.

The properties of polytetrafluoroethylenes such as high temperature resistance, chemical stability, and low friction surface, have led to the widespread use of this polymer in the form of films, coatings and impregnants. Unfortunately, the nature of the polymer, i.e., the fact that it is sintered rather than melt-fabricated, causes the exposed surface of the polymer to have some degree of roughness which, in turn, renders the surface not as glossy as desired for some applications for aesthetic or for functional reasons.

The present invention involves the discovery that the gloss of coatings obtained from polytetrafluoroethylene aqueous dispersions can be improved by incorporating into the dispersion small, but gloss improving, effective amounts of a dispersion of a nonelastomeric melt-fabricable tetrafluoroethylene copolymer and a nonionic surfactant. The resultant aqueous dispersion when cast in the conventional manner such as by contacting a substrate and the dispersion one with the other, followed by drying of the dispersion and sintering, yields a polytetrafluoroethylene coating of improved gloss over that which is obtained for the current commercially available polytetrafluoroethylene dispersions. The compositions of the present invention achieve improved gloss of coatings prepared therefrom without the use of any filler or lubricant.

Each component of compositions of the present invention, i.e., the polytetrafluoroethylene aqueous dispersion component, the melt-fabricable tetrafluoroethylene copolymer aqueous component, and the surfactant, is a wellknown material of commerce. More specifically, the polytetrafluoroethylene aqueous dispersion component can be any dispersion of colloidal particles of polytetrafluoroethylene in water. Examples of such dispersions include those disclosed in U.S. Pat. Nos. 2,534,058, to Renfrew; 2,559,752, to Berry, and 2,559,749 to Benning, as well as the concentrated polytetrafluoroethylene aqueous dispersions disclosed in U.S. Pat. Nos. 2,478,229 to Berry and 3,037,953 to Marks and Whipple, and the large particle dispersions disclosed in U.S. Pat. No. 3,391,099 to Punderson. The polytetrafluoroethylene of the dispersions of this invention has an apparent melt viscosity of at least $1 \times 10^9$ poises at 389°C. under a shear stress of 0.457 kg/cm$^2$ using the melt indexer described in U.S. Pat. No. 2,946,763. The polytetrafluoroethylene in the aqueous dispersion can be modified by copolymerization with a small amount of another copolymerizable monomer, such as up to two percent by weight of units derived from perfluoroalkyl ethylene or oxyperfluoroalkyl trifluoroethylene of 3 to 10 carbon atoms, as disclosed in U.S. Pat. No. 3,142,665 to Cardinal, Edens and Van Dyk. The preferred comonomer is hexafluoropropylene. The resultant polytetrafluoroethylene retains its nonmelt fabricable character.

Briefly, a process for making the dispersion involves pressuring tetrafluoroethylene into an aqueous solution of polymerization initiator and dispersing agent under mild agitation to produce an aqueous dispersion of colloidal size particles of polytetrafluoroethylene concentrations of 15 to 45 percent by weight of polymer solids. The result of the present invention does not depend on which polymerization initiator and dispersing agent are used so long as the end result obtained is the aqueous dispersion of polytetrafluoroethylene. Typically, however, the initiator will be a water-soluble peroxy compound such as the inorganic persulfates, e.g., ammonium persulfate, or organic peroxides, e.g., disuccinic acid peroxide, and the dispersing agent used during polymerization will be an anionic dispersing agent which imparts a negative charge to the polymer particles in the dispersion. The most used anionic dispersing agents are the fluorinated carboxylic acids or carboxylates, e.g., an ammonium polyfluorocarboxylate containing from 7 to 10 carbon atoms. The amount of dispersing agent usually used is from 0.2 to 0.8 percent based on the weight of polymer solids. The dispersion may be used in the present invention in this form or may be concentrated to higher solids contents such as up to 75 percent by weight polymer solids. Preferably, the particle size of the PTFE particles in the dispersion are of the larger size variety, i.e., at least 0.3 micron in average particle diameter which can be made by the process of the aforementioned Punderson patent by gradually adding the dispersing agent to the polymerization system during the early stage of polymerization. The particles can be spherical or irregular in shape such as elongated. Particle size is determined by the light scattering method disclosed in the Punderson patent, except that the refractive index increment is taken as 0.020 because of the presence of surfactant.

With respect to the nonelastomeric melt-fabricable tetrafluoroethylene copolymer aqueous dispersion component of the composition of this invention, the polymer thereof is a copolymer of tetrafluoroethylene with at least sufficient other ethylenically unsaturated copolymerizable monomer to render the resultant polymer melt fabricable. Preferably, this is a maximum of 20 mole percent of hexafluoropropylene. Generally, no more than 35 percent by weight of the ethylenically unsaturated copolymerizable monomer is present in the copolymer in order for said copolymer to be melt fabricable and nonelastomeric. With other comonomers this limit may be lower. "Melt fabricable" means that the copolymer has a specific melt viscosity of less than $10^7$ poises at 380°C. at a shear stress of 6.5 psi. Any perfluorocarbon ethylenically unsaturated nonomer which has this effect when copolymerized with tetrafluoroethylene can be used. Nonelastomeric is defined by considering the definition of elastomer to be a material which at room temperature can be stretched repeatedly to at least twice its original length and upon immediate release of the stress will return with force to its approximate original length. Examples of such nonelastomeric copolymers include the tetrafluoroethylene/hexafluoropropylene copolymers disclosed in U.S. Pat. No. 2,946,763 to Bro and Sandt, the copolymers of tetrafluoroethylene with higher perfluoroalkenes such as those containing from 4 to 10 carbon atoms, copolymers of tetrafluoroethylene with perfluoro(alkyl vinyl ethers), e.g., perfluoro(propyl or ethyl vinyl ethers) disclosed in U.S. Pat. No. 3,132,123 to Harris and McCane, and the copolymer of tetrafluoroethylene with perfluoro(2-methylene-4-methyl-1,3-dioxolane) disclosed in U.S. Pat. 3,308,107 to Selman and Squire.

Aqueous dispersions of the above-described copolymers can be prepared substantially in the same way as the polytetrafluoroethylene aqueous dispersions. For example, the procedure of Example 1 of U.S. Pat. No. 2,946,763 to Bro and Sandt can be followed.

The surfactant component of composition of the present invention is any nonionic surfactant which is soluble in water at room temperature (20°–25°C.) at the concentration desired. The nonionic surfactant can be composed of a single surfactant or a mixture of nonionic surfactants. The nonionic surfactant preferably should have sufficent volatility so that at least 95 percent by weight of the surfactant is burned out of the polytetrafluoroethylene during its sintering which is generally done at a temperature in the range of 340° to 400°C. for 5 seconds to 10 minutes. The surfactants of this invention are composed of molecules, which have one hydrophobic end and one hydrophilic end, that are thus soluble in water. Typically such surfactants are prepared as reaction products of ethylene oxide with other compounds which impart hydrophobic moieties to the resultant surfactant, as propylene oxide, amines, saturated and unsaturated alcohols and acids, and alkyl pehenols. Other suitable nonionic surfactants which do not involve reaction with ethylene oxide but which can be used in the present invention are the alkanol amides and the fatty esters such as the methyl esters of caprylic, caproic, stearic, and oleic acids. For purposes of illustration, some of the foregoing mentioned nonionic surfactants are further illustrated hereinafter by the formulae:

$$R[O\text{---}(a\text{---})_n H]_x$$

wherein $(\text{---}A\text{---})_n$ is the group $(\text{---}C_2H_4O\text{---})_n$ or a mixture of the groups $(\text{---}C_2H_4O\text{---})_a$ and $(\text{---}C_3H_6O\text{---})_b$, wherein $n$ in each instance is an integer of from 2 to 50 and preferably 2 to 18, $b$ is an integer of 0 to 30, and $a$ is an integer of at least 2, $a + b$ being equal to n; x is an integer of 1, 2, or 3; and R is an aliphatic hydrocarbon group which can be saturated or unsaturated, straight-chain, branched, or cyclic, and will generally contain from 8 to 24 carbon atoms, preferably from 8 to 18 carbon atoms; examples of R groups include oleyl, stearyl, tridecyl, lauryl, decyl and the groups derived from aliphatic glycols and triols; R' -C$_6$H$_4$O (B)$_m$H, wherein B is the group $(\text{---}C_2H_4O\text{---})_c$ or a mixture of the groups $(\text{---}C_2H_4O\text{---})_c$ and $(\text{---}C_3H_6O\text{---})_d$, wherein m in each instance is an integer of from 2 to 50 and preferably 8 to 20, $d$ is an integer of 0 to 30, $c$ is an integer of at least 2, $c + d$ being equal to $m$; R' is a monovalent aliphatic and usually saturated and containing 4 to 20 carbon atoms and preferably 8 to 12 carbon atoms;

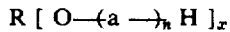

and

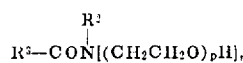

wherein $p$ is an integer of 2 to 50, $z$ is an integer of 1 or 2, $R^3$ is an alkyl group containing 1 to 8 carbon atoms, $R^2$ is a chemical bond to a group $(\text{---}CH_2CH_2O\text{---})_pH$, when $z$ is 2 and an alkyl group of 1 to 8 carbon atoms are provided by $R^2 + R^3$; the polyalkylene oxide block copolymers of the formula

wherein f is an integer of from 15 to 65 and e and f are integers sufficiently large that $e + g$ total 20 to 90 percent of the total weight of the polymer. For each of the surfactants of the foregoing described formulae, the hydrophobic and hydrophilic moieties are proportioned such and the total molecular weight is such that the aforementioned requirement of water solubility is met and preferably that the aforementioned degree of volatility is also met. Additional specific surfactants include $CH_3(CH_2)_4CH_2(OCH_2CH_2)_3OH$; $CH_3\text{---}(CH_2)_6CH_2(OCH_2CH_2)_3OH$; $CH_3(CH_2)_{10}CH_2(OCH_2CH_2)_{1-2}(OCH(CH_3)_2CH)_5OH$; $CH_3(CH_2)_8CH_2(OCH_2CH_2)_{10}OH$; $CH_3(CH_2)_8CH_2(OCH_2CH_2)_5OH$; and

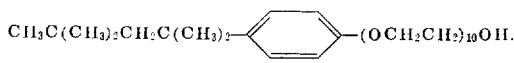

The proportions of the components used to make compositions of the present invention will depend on the result desired. Only small amounts of the copolymer and dispersing agent are required to enhance the surface gloss of the polytetrafluoroethylene, and excessive amounts tend to detract from the beneficial properties of the polytetrafluoroethylene, e.g., too much copolymer lowers the softening point of the polytetrafluoroethylene. Thus, the composition of this invention contains from 1 to 6 percent of copolymer based on the weight of polytetrafluoroethylene present in the composition. The amount of nonionic surfactant will generally be from 3 to 15 percent based on the total weight of polymer solids (polytetrafluoroethylene plus copolymer) present in the composition, with the preferred range being from 4 to 9 percent by weight. The proportion of the polymer solids in the composition is preferably from 40 to 65 percent based on the total weight of the composition (dispersion).

The compositions of the present invention can be prepared by blending separate aqueous dispersions of the polytetrafluoroethylene and copolymer components. The surfactant is dissolved in either of the dispersions or in the resultant blend thereof. Further details on blending dispersions of this type for the purpose of preparing solid colloidal blends of polytetrafluoroethylene with tetrafluoroethylene/hexafluoroethylene copolymer is disclosed in U.S. Pat. No. 3,051,682 to Mallouk.

The compositions of the present invention are cast in a conventional manner by contacting a substrate and the composition one with the other, followed by drying and sintering of the polytetrafluoroethylene to give a polymer coating of improved gloss. The contacting step can take the form of spraying the dispersion onto the substrate or dipping the substrate into the dispersion to coat and/or impregnate the substrate. If the substrate is smooth surfaced, the coating can be removed to form film. The coating (or film) thickness can be built up by repeated coating after each drying and sintering cycle.

Examples of the present invention are as follows (parts and percents are by weight unless otherwise indicated):

PREPARATION OF COMPOSITION

The co-dispersions were prepared by blending an aqueous dispersion of polytetrafluoroethylene with an aqueous dispersion of copolymer under mild agitation to avoid coagulation. The nonionic surfactant was added straight or as an aqueous solution to the dispersions. The polymer solids concentration in the resultant dispersion was 49 percent based on the total weight of the dispersion.

MEASUREMENT OF GLOSS

Glass fabric (No. 128 type) was coated with various dispersion formulations according to the procedure described below. A swatch of cloth, 5½× 5 inches, preferably coated with cement on all four edges to keep the cloth from unraveling, was clamped on opposite sides to a stretching apparatus. The apparatus was adjusted so that the cloth was taut. The stretched cloth was then dipped into the dispersion being tested for 15 seconds. After removal from the dispersion, the cloth was allowed to dry for 30 minutes at room temperature. This was followed by heating at 100°C. for 5 minutes and at 380°C. for four minutes. The cloth was flat and held its shape. Successive coats (5 to 7 coats) were made in the same manner except the cloth was simply held by one 2½ inch wide spring-loaded jaw clip. After the final coat, the coated cloth sample was trimmed to dimensions of about 4 × 4 inches. The gloss of the square 4 × 4 inch sample was measured using a Portable Gardner 60° Glossmeter, Model GC-9045 (P-5), according to the procedure described below. The instrument was standardized first. It was placed on the surface of a primary black gloss standard, which had been cleaned, in a manner such that the light exiting the aperture was focused directly on the center of the plaque. The glossmeter was turned on and allowed to warm up for at least 30 minutes. The rheostat knob was then adjusted until the meter read 94%. In a similar manner, the glossmeter was adjusted to 30 ± 1% using a secondary white standard. This calibration was checked occasionally during gloss reading determinations. The coated cloth sample was then placed on a 4½ × 4½ × ½ inch wooden plaque previously painted with flat black paint. After positioning the sample in order that the edges were parallel with those of the plaque, the glossmeter was place on the sample in such a manner that (1) the light exiting the aperture was focused directly on the center of the sample and (2) the direction of the horizontal component of the light beam was parallel to an edge of the sample. At the end of a few seconds, the reading from the glossmeter had been moved successively to slightly different positions. Additional series of three readings were obtained in the perpendicular direction and similarly in the mutually perpendicular directions as defined by the edges of the cloth on the other side of the coated glass cloth. The overall average was taken as the gloss reading. Usually, the average of the readings in different directions was within ± 1 unit on the glossmeter scale.

EXAMPLE 1

In this Example, the polytetrafluoroethylene aqueous dispersion contained 60 percent polytetrafluoroethylene solids based on the total weight of the dispersion, 6 percent of polyethylene glycol mono-para-octylphenyl ether, available as Triton X-100, (trademark of Rohm and Haas), based on the weight of polymer, and had an average particle diameter of 0.23 micron. The coating of polytetrafluoroethylene on glass fabric, prepared by the previously described general procedure, gave a glossmeter reading of 6 for seven coats having a total thickness of 9.7 microns.

A blend of this dispersion was prepared with 3 percent of Triton X-100 (based on the weight of polytetrafluoroethylene in the dispersion) and 3 percent by volume based on the total volume of the co-dispersion of an aqueous dispersion, which is equivalent to 2.7 percent by weight of solid tetrafluoroethylene/hexafluoropropylene copolymer based on the weight of polytetrafluoroethylene. The tetrafluoroethylene/hexafluoropropylene copolymer dispersion contained 55 percent copolymer solids by weight, an average diameter of 0.16 micron, and containing 6 percent Triton X-100 non-ionic surfactant (based on the weight of the copolymer) and had an infrared ratio of 3.49 (A 10.18u/A 4.25u) equivalent to 15.9% by weight of hexafluoropropylene as measured by the procedure disclosed in U.S. Pat. No. 2,946,763 to Bro and Sandt and a specific melt viscosity of 6–10 ×10$^4$ poises at 389°C. at a shear stress of 6.5 psi.

The total surfactant content was about 9 percent based on the total weight of polymer solids. Water was added to reduce the polymer solids content to 49 percent. The coating of the polymer blend for this co-dispersion on glass fabric, prepared by the previously described general procedure, gave a glossmeter reading of 15 for seven coats having a total thickness of 9.4 microns.

This experiment was repeated except that the polytetrafluoroethylene in the polytetrafluoroethylene aqueous dispersion had a standard specific gravity (SSG) of 2.23 as compared to 2.22 for the polytetrafluoroethylene in the dispersion used earlier in this Example. The polytetrafluoroethylene aqueous dispersion by itself gave a glossmeter reading for the coating of 8 for seven coats having a total thickness of 9.5 microns. The composition consisting of this dispersion and the copolymer dispersion (2 percent by volume, which is equivalent to 1.8 percent by weight of copolymer solids based on the weight of polytetrafluoroethylene) and surfactant gave a glossmeter reading for the coating of 20 for seven coats having a total thickness of 9.6 microns.

EXAMPLE 2

The procedure of Example 1 with 2.7% by weight of copolymer was repeated except that (a) the polytetrafluoroethylene of the polytetrafluoroethylene aqueous dispersion was modified with hexafluoropropylene as described in U.S. Pat. No. 3,142,665 to Cardinal, Edens, and Van Dyk to have an infrared ratio of 0.39 cA 10.18$\mu$/A 10.7$\mu$) (i.e., about 0.1% hexafluoropropylene) and an average particle diameter of 0.18 micron (using a refractive index increment of 0.20 gms/cc), and (b) the total concentration of Triton X-100 was 8 percent based on the weight of total polymer solids. The composition of the co-dispersion plus surfactant gave a glossmeter reading of 18 for the coating of seven coats having a total thickness of 9.2 microns. The control polytetrafluoroethylene aqueous dispersion of this Example gave a glossmeter reading of 7 for the coating of seven coats having a total thickness of 10.1 microns.

EXAMPLE 3

The procedure of Example 1 was repeated except that the copolymer of the copolymer aqueous dispersion was tetrafluoroethylene/perfluoro(propyl vinyl ether) copolymer having an infrared ratio of 2.80 (A 10.07$\mu$/A 4.25$\mu$) (i.e., about 3% perfluro(propyl vinyl ether) and a specific melt viscosity of about 140 × 10$^4$ poises at 380°C. at a shear stress of 6.5 psi. The dispersion of this copolymer was 60 percent polymer solids based on the weight of the dispersion and contained 6 percent Triton X-100 based on the weight of the copolymer (no extra Triton X-100 was added to the co-dispersion). The composition comprising tetrafluoroethylene aqueous dispersion, copolymer aqueous dispersion (3 percent by weight copolymer based on the weight of polytetrafluoroethylene), and nonionic surfactant in the proportions set forth in Example 1 except as otherwise indicated herein gave a glossmeter reading of 12 on the coating comprised of 7 coats of a total thickness of 9.2 microns, as compared to a glossmeter reading of 6 for the coating prepared from polytetrafluoroethylene aqueous dispersion by itself.

EXAMPLE 4

The procedure of Example 1 with 2.7 percent by weight of copolymer was repeated except that surfactant was a mixture of $CH_3(CH_2)_8CH_2(OCH_2CH_2)_5OH$ and $CH_3(CH_2)_xCH_2(OCH_2CH_2)_y(OCH(CH_3)_2)_zOH$, wherein $x$, $y$ and $z$ are 10–11, 12–13, and 4–5, respectively, available as Alfonic (Continental Oil Co.) 1012-60 and DN-65 (Rohm and Haas), respectively, the former being present in the amount 1.8 percent and the latter 7.3 percent, based on the total weight of polymer solids (60 percent by weight) in the polytetrafluoroethylene dispersion. The co-dispersion surfactant composition (no extra surfactant added to co-dispersion) gave a glossmeter reading of 17 for the coating comprising seven coats having a total thickness of 9.6 microns, as compared to a glossmeter reading of 6 for coating prepared from the polytetrafluoroethylene aqueous dispersion alone. The average particle diameter of the polytetrafluoroethylene in this Example was 0.34 micron.

As many apparently widely different embodiments of this invention may be made without departing from the spirit and scope thereof, it is to be understood that this invention is not limited to the specific embodiments thereof except as defined in the appended claims.

The invention claimed is:

1. The composition consisting essentially of an aqueous dispersion of (a) a non-melt-fabricable polytetrafluoroethylene, (b) a nonelastomeric, melt-fabricable tetrafluoroethylene copolymer and (c) a nonionic surfactant for said polytetrafluoroethylene and said copolymer, said tetrafluoroethylene copolymer being a copolymer of tetrafluoroethylene with sufficient other perfluorinated ethylenically unsaturated copolymerizable monomer to make the copolymer melt-fabricable said copolymer being present in the amount from 1 to 6 percent based on the weight of said polytetrafluoroethylene, said nonionic surfactant being present in the amount from 3 to 15 percent based on the weight of said polytetrafluoroethylene plus said copolymer, said polytetrafluoroethylene and said copolymer being in the form of particles dispersed in the water of said dispersion.

2. The composition of claim 1 wherein the perfluorinated ethylenically unsaturated copolymerizable monomer is selected from hexafluoropropylene, perfluoroalkene containing from 4 to 10 carbon atoms, perfluoro(alkyl vinyl ether), or perfluoro-(2-methylene-4-methyl-1,3-dioxolane).

3. The composition of claim 1 wherein the polytetrafluoroethylene has an average particle diameter of at least 0.3 micron.

4. The composition of claim 1 wherein the proportion of total polymer solids is 40 to 65 percent based on the total weight of the composition.

5. The composition of claim 1 wherein from 4 to 9 percent of said nonionic surfactant is present based on the weight of said polytetrafluoroethylene plus said copolymer.

6. The composition of claim 1 wherein said nonionic surfactant is an alkanol amide, an ester of a fatty acid, or a reaction product of ethylene oxide with propylene oxide, amine, saturated or unsaturated alcohol or acid, or alkyl phenol.

7. The composition consisting essentially of an aqueous dispersion of (a) a non-melt-fabricable polytetrafluoroethylene, (b) a melt-fabricable tetrafluoroethylene copolymer and (c) a nonionic surfactant for said polytetrafluoroethylene and said copolymer, said tetrafluoroethylene copolymer being a copolymer of tetrafluoroethylene with up to about 16% by weight hexafluoropropylene, said copolymer being present in the amount from 1 to 6 percent based on the weight of said polytetrafluoroethylene, said nonionic surfactant being present in the amount from 3 to 15 percent based on the weight of said polytetrafluoroethylene plus said copolymer, said polytetrafluoroethylene and said copolymer being in the form of particles dispersed in the water of said dispersion.

8. The composition consisting essentially of an aqueous dispersion of (a) a non-melt-fabricable polytetrafluoroethylene, (b) a melt-fabricable tetrafluoroethylene copolymer and (c) a nonionic surfactant for said polytetrafluoroethylene and said copolymer, said tetrafluoroethylene copolymer being a copolymer of tetrafluoroethylene with up to about 3% by weight perfluoro(propyl vinyl ether), said copolymer being present in the amount from 1 to 6 percent based on the weight of said polytetrafluoroethylene, said nonionic surfactant being present in the amount from 3 to 15 percent based on the weight of said polytetrafluoroethylene plus said copolymer, said polytetrafluoroethylene and said copolymer being in in the form of particles dispersed in the water of said dispersion.

9. The composition consisting essentially of an aqueous dispersion of (a) a non-melt-fabricable polytetrafluoroethylene, (b) a melt-fabricable tetrafluoroethylene copolymer, and (c) a nonionic surfactant for said polytetrafluoroethylene and said copolymer, said tetrafluoroethylene copolymer being a copolymer of tetrafluoroethylene with sufficient other perfluorinated ethylenically unsaturated copolymerizable monomer to make the copolymer melt-fabricable, said other perfluorinated ethylenically unsaturated copolymerizable monomer being selected from hexafluoropropylene, perfluoroalkene containing from 4 to 10 carbon atoms, perfluoro(alkyl vinyl ether), perfluoro-(2-methylene-4-methyl-1,3-dioxolane), said copolymer being present in the amount from 1 to 6 percent based on the weight of said polytetrafluoroethylene, said nonionic surfactant being present in the amount from 3 to 15 percent based on the weight of said polytetrafluoroethylene plus said copolymer, said polytetrafluoroethylene and said copolymer being in the form of particles dispersed in the water of said dispersion.

* * * * *